United States Patent
Kageyama et al.

(10) Patent No.: US 11,999,860 B2
(45) Date of Patent: Jun. 4, 2024

(54) ZIRCONIUM NITRIDE POWDER COATED WITH ALUMINA AND PROCESS FOR PRODUCING THE SAME

(71) Applicant: MITSUBISHI MATERIALS ELECTRONIC CHEMICALS CO., LTD., Akita (JP)

(72) Inventors: Kensuke Kageyama, Akita (JP); Naoyuki Aiba, Akita (JP)

(73) Assignee: MITSUBISHI MATERIALS ELECTRONIC CHEMICALS CO., LTD., Akita (JP)

(*) Notice: Subject to any disclaimer, the term of this patent is extended or adjusted under 35 U.S.C. 154(b) by 492 days.

(21) Appl. No.: 17/442,695

(22) PCT Filed: Mar. 26, 2020

(86) PCT No.: PCT/JP2020/013527
§ 371 (c)(1),
(2) Date: Sep. 24, 2021

(87) PCT Pub. No.: WO2020/196703
PCT Pub. Date: Oct. 1, 2020

(65) Prior Publication Data
US 2022/0119646 A1 Apr. 21, 2022

(30) Foreign Application Priority Data

Mar. 28, 2019 (JP) .................. 2019-062413

(51) Int. Cl.
*C09C 3/00* (2006.01)
*C09C 1/00* (2006.01)
(Continued)

(52) U.S. Cl.
CPC .............. *C09C 3/006* (2013.01); *C09C 1/00* (2013.01); *C09C 3/041* (2013.01); *C09C 3/063* (2013.01);
(Continued)

(58) Field of Classification Search
CPC ....... C01B 21/0768; C09C 1/00; C09C 3/006; C09C 3/041; C09C 3/063; C01P 2004/04; C01P 2004/84
See application file for complete search history.

(56) References Cited

U.S. PATENT DOCUMENTS 9,028,954 B2 5/2015 Schier
2012/0295113 A1* 11/2012 Kurizoe ............ C04B 35/62685
501/134

(Continued)

FOREIGN PATENT DOCUMENTS

CN 102712542 A 10/2012
CN 103962588 A 8/2014
(Continued)

OTHER PUBLICATIONS

ESR for EP App. No. 20777351.6, dated Dec. 14, 2022.
(Continued)

*Primary Examiner* — Shuangyi Abu Ali
(74) *Attorney, Agent, or Firm* — Greenblum & Bernstein, P.L.C.

(57) ABSTRACT

A zirconium nitride powder coated with alumina has a volume resistivity is $1 \times 10^6$ Ω·cm or higher. Also, an coating amount with alumina is 1.5% by mass to 9% by mass with respect to 100% by mass of the zirconium nitride. Furthermore, an isoelectric point of the zirconium nitride powder coated with alumina is 5.7 or higher.

4 Claims, 1 Drawing Sheet

(51) Int. Cl.
*C09C 3/04* (2006.01)
*C09C 3/06* (2006.01)
(52) U.S. Cl.
CPC ...... *C01P 2004/04* (2013.01); *C01P 2004/84* (2013.01)

(56) References Cited

U.S. PATENT DOCUMENTS

| | | |
|---|---|---|
| 2020/0156943 A1 | 5/2020 | Kageyama et al. |
| 2020/0198969 A1 | 6/2020 | Kageyama et al. |

FOREIGN PATENT DOCUMENTS

| | | |
|---|---|---|
| CN | 105531318 A | 4/2016 |
| EP | 3085736 A1 | 10/2016 |
| EP | 3521242 A1 | 8/2019 |
| JP | H7-53269 A | 2/1995 |
| JP | 2002-167639 A | 6/2002 |
| JP | 2015-117302 A | 6/2015 |
| JP | 2017-222559 A | 12/2017 |
| JP | 2018-203599 A | 12/2018 |
| TW | 201427923 A | 7/2014 |
| WO | WO 2006/001791 A1 | 1/2006 |
| WO | WO 2011/081103 A1 | 7/2011 |
| WO | WO 2018/225318 A1 | 12/2018 |

OTHER PUBLICATIONS

Yin et al., "Synthesis of ZrN powders by aluminum-reduction nitridation of $ZrO_2$ powders with $CaCO_3$ additive", Ceramics International, 43:3183-3189 (2016).

Office Action for CN App. No. 202080025017.6, dated Aug. 18, 2023 (w/ partial translation).

Egorov, "Electrical Conductivity of $ZrN-Al_2O_3$, $Mo-Al_2O_3$, and ZrN—Mo Composite Powders", Institute of Materials Science, 214(10):56-60, (1980).

ISR for PCT/JP2020/013527, dated Jun. 16, 2020.

Written Opinion for PCT/JP2020/013527, dated Jun. 16, 2020.

* cited by examiner

[Fig. 1]
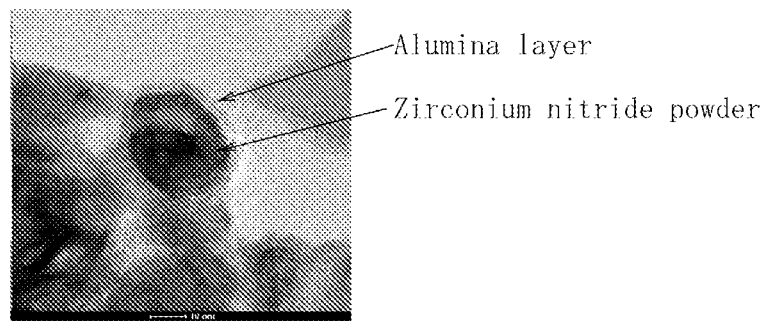
[Fig. 2]
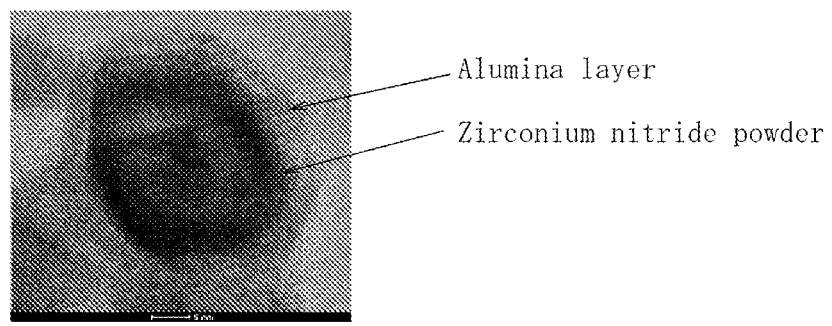

ZIRCONIUM NITRIDE POWDER COATED WITH ALUMINA AND PROCESS FOR PRODUCING THE SAME

TECHNICAL FIELD

The present invention relates to a zirconium nitride powder coated with alumina, which is used for a high-definition liquid crystal, a black matrix for organic EL, a light shielding material for an image sensor, a light shielding material for an optical member, a light shielding filter, an IR (infrared) cut filter, a coverlay film, a light shielding film for an electronic member, a black film, a UV curable adhesive, and the like, and a process for producing this powder. This international application claims priority based on Japanese Patent Application No. 62413 (Japanese Patent Application No. 2019-62413) filed on Mar. 28, 2019, and the entire contents of Japanese Patent Application No. 2019-62413 are incorporated into this international application.

BACKGROUND ART

Conventionally, there has been disclosed a black titanium oxynitride powder, comprising a powder base and a silicic layer having a thickness of 2.5 to 12 nm that coats the surface of this powder base, having a volume resistivity of $1\times10^5$ Ω·cm or higher in the state of a green compact hardened at a pressure of 5 Mpa, and used as a resin compound for a semiconductor encapsulation (see, for example, Patent Document 1 (claim 1, paragraph [0007]).

In the black titanium oxynitride powder thus constructed, the surface of the powder base is coated with the silicic layer having a thickness of 2.5-12 nm, and the volume resistivity of the black titanium oxynitride powder in the state of the green compact hardened at a pressure of 5 Mpa is as high as $1\times10^5$ Ω·cm or higher, so the black titanium oxynitride powder has high electrical insulation and a high α-ray shielding property. As a result, when the black titanium oxynitride powder is used as a filler in a resin compound for encapsulating a semiconductor device and the like, even if a wiring pitch of the semiconductor device is narrowed, the black titanium oxynitride powder, which is a filler for this, does not short-circuit the wiring, and may also suppresses the occurrence of a soft error, which is a malfunction caused by the α-ray in the semiconductor device and the like.

PRIOR ART DOCUMENT

Patent Document

Patent Document 1: JP 2015-117302A

DISCLOSURE OF INVENTION

Problems to be Solved by the Invention

However, in the black titanium oxynitride powder shown in the above conventional patent document 1, since the titanium oxynitride powder was coated with the silicic layer, an isoelectric point became the acid side, which is not compatible with an acrylic resin having an acid group, when the black titanium oxynitride powder was dispersed in a solution such as ethanol, then there was a problem that the compatibility with the acrylic resin having the acid group was not good.

An object of the present invention is to provide a zirconium nitride powder coated with alumina, which may improve compatibility with an acrylic resin and the like, and may also improve moisture resistance in combination with a gas barrier property, and a process for producing the same.

Means to Solve the Problems

A first aspect of the present invention is a zirconium nitride powder coated with alumina, wherein a volume resistivity is $1\times10^6$ Ω·cm or higher, a coating amount with alumina is 1.5% by mass to 9% by mass with respect to 100% by mass of the zirconium nitride, and an isoelectric point of the zirconium nitride powder is 5.7 or higher.

A second aspect of the present invention is a process for producing a zirconium nitride powder coated with alumina, comprising the steps of: grinding a zirconium nitride powder in water to prepare a zirconium nitride slurry, dissolving an aluminum compound in a solvent to prepare an aluminum compound solution, adding the aluminum compound solution to the zirconium nitride slurry so that zirconium nitride powder:alumina has a mass ratio of (100:1.5) to (100:15), coating the zirconium nitride powder with the aluminum compound by adding an acid to the zirconium nitride slurry to which the aluminum compound solution has been added, so as to adjust a pH of the zirconium nitride slurry and deposit the aluminum compound on the surface of the zirconium nitride powder, washing and then collecting the zirconium nitride powder coated with the aluminum compound, obtaining the zirconium nitride coated with alumina by calcining this collected zirconium nitride powder coated with the aluminum compound in an air or nitrogen atmosphere at a temperature of 60° C. to 200° C. for 1 hour to 24 hours.

A third aspect of the present invention is an invention based on the second aspect, wherein the aluminum compound is either aluminum hydroxide, aluminum sulfate, or sodium aluminate.

A fourth aspect of the present invention is a process for producing a zirconium nitride powder coated with alumina, comprising the steps of: dispersing a zirconium nitride powder in a solvent to prepare a zirconium nitride slurry, adding an aluminate coupling agent to the zirconium nitride slurry so that zirconium nitride powder:alumina has a mass ratio of (100:1.5) to (100:15), removing a supernatant liquid by decantation to obtain a precipitate, obtaining the zirconium nitride coated with alumina by calcining this precipitate in a nitrogen atmosphere at a temperature of 200° C. to 400° C. for 3 hours to 24 hours.

Effects of the Invention

In the zirconium nitride powder coated with alumina of the first aspect of the present invention, the volume resistivity is $1\times10^6$ Ω·cm or higher, the coating amount with alumina is 1.5% by mass to 9% by mass with respect to 100% by mass of the zirconium nitride, and an isoelectric point of the zirconium nitride is 5.7 or higher, and therefore the compatibility with an acrylic resin is good, and the compatibility between the alumina-coated zirconium nitride powder (black pigment) and the acrylic resin may be improved. Furthermore, by coating the zirconium nitride powder with alumina, moisture resistance in combination with a gas barrier property may also be improved.

In the process for producing the zirconium nitride powder coated with alumina of the second aspect of the present invention, the aluminum compound solution is added to the water slurry, and then a pH of this water slurry is adjusted to deposit the aluminum compound on the surface of the zirconium nitride powder. Furthermore, the zirconium nitride with this aluminum compound deposited on the surface may be washed and calcined to obtain the zirconium nitride coated with the above alumina.

In the process for producing the zirconium nitride powder coated with alumina of the third aspect of the present invention, since the aluminum compound is either aluminum hydroxide, aluminum sulfate, or sodium aluminate, the aluminum compound may be quickly deposited on the surface of the zirconium nitride powder by adjusting the pH of the water slurry to which the above aluminum compound solution has been added.

In the process for producing the zirconium nitride powder coated with alumina of the fourth aspect of the present invention, the aluminate coupling material is added to the zirconium nitride slurry obtained by dispersing zirconium nitride in the solvent, and then the precipitate obtained by decantation from the zirconium nitride slurry to which this aluminate coupling material has been added is calcined, and therefore the zirconium nitride coated with the above alumina may be obtained.

BRIEF DESCRIPTION OF DRAWINGS

FIG. 1 is a transmission electron microscopy (TEM) photograph (×500,000) showing the zirconium nitride powder coated with alumina (the zirconium nitride powder whose surface is coated with an alumina layer) in Example 1.

FIG. 2 is a transmission electron microscopy (TEM) photograph (×1,000,000) showing the zirconium nitride powder coated with alumina (the zirconium nitride powder whose surface is coated with an alumina layer) in Example 1.

EMBODIMENTS TO CARRY OUT THE INVENTION

Next, embodiments for carrying out the present invention will be described with reference to the drawings. The zirconium nitride powder coated with alumina of the present invention has a volume resistivity of $1 \times 10^6$ Ω·cm or higher, preferably $1 \times 10^7$ Ω·cm or higher, a coating amount with alumina of 1.5% by mass to 9% by mass, preferably 3% by mass to 7% by mass, with respect to 100% by mass of zirconium nitride, and an isoelectric point of 5.7 or higher, preferably 5.8 or higher.

Herein, the volume resistivity of the alumina-coated zirconium nitride powder is obtained as follows. First, the above powder is placed in a pressure vessel and compressed at 5 MPa to 10 MPa to form a green compact, and a resistance of the green compact is measured with a digital multimeter. Then, the volume resistivity (Ω·cm) of the powder is obtained by multiplying the obtained resistance value by a resistivity correction factor (RCF), which is referenced based on a thickness of the green compact, and a shape of an apparatus and the thickness of the green compact. The volume resistivity of the above powder was limited to $1 \times 10^6$ Ω·cm or higher, because lower than $1 \times 10^6$ Ω·cm may cause an insulation failure in a high temperature and high humidity environment. Furthermore, the coating amount with alumina was limited to the range of 1.5% by mass to 9% by mass with respect to 100% by mass of the zirconium nitride, because if it is lower than 1.5% by mass, the isoelectric point is on the acid side and the compatibility with an acrylic resin having an acid group is not good, if it exceeds 9% by mass, coloring power is reduced.

On the other hand, the isoelectric point of the alumina-coated zirconium nitride powder refers to the hydrogen ion concentration (pH) at which the powder does not move, when a voltage is applied to the dispersion, because the overall charge on a single powder becomes zero, when the hydrogen ion concentration (pH) of the dispersion in which this powder is dispersed is changed. In other words, inorganic nitride powders such as the zirconium nitride powder, have an isoelectric point at which zeta potential changes significantly, when the hydrogen ion concentration (pH) changes, surface potential (zeta potential) becomes zero at a certain hydrogen ion concentration (pH), and no electrophoresis is shown at all. Zeta potential is defined as the potential of a slip surface at which liquid flow begins to occur in an electric double layer, which is an electrical double structure formed by attracting ions having an opposite polarity charge around a powder having a certain polarity charge in a dispersion. This zeta potential is measured, for example, using a zeta potential meter (model: DT1202) produced by Dispersion Technology, as follows. This zeta potential is measured using the colloidal vibration current method. The above dispersion is placed in a container and sandwiched between a pair of electrodes, and a predetermined voltage is applied to these electrodes to move the powders in the dispersion. As a result, the charged particles, and the counter ions around them are polarized, generating an electric field called the colloidal vibration potential, which may be detected as an electric current. This current becomes the colloidal vibration current. The zeta potential is determined from the measured colloidal vibration current using Smoluchowski formula and the coupled-phase model. Then, the pH at which the zeta potential became zero is the isoelectric point of the above powder. The isoelectric point of the above powder was limited to 5.7 or higher in order to position the isoelectric point of the alumina-coated zirconium nitride powder on the alkaline side. As a result, the alumina-coated zirconium nitride powder (black pigment) becomes more compatible with an acrylic resin having an acid group, and the compatibility between the alumina-coated zirconium nitride powder (black pigment) and the acrylic resin is improved, and moisture resistance in combination with a barrier property of the alumina coating is improved.

On the other hand, the L* value of the above powder (black pigment) is preferably 13 or lower, the BET specific surface area of the above powder (black pigment) is preferably 20 m²/g or higher. Herein, the L* value of the alumina-coated zirconium nitride powder (black pigment) refers to the brightness index in CIE 1976 L*a*b* color space (light source for measurement C: color temperature 6774K). The above CIE 1976 L*a*b* color space is a color space defined by the International Commission on Illumination (CIE) by converting the CIEXYZ color system in 1976 so that a certain distance in the color system has a difference in the same step rate almost perceptually in any color region. In addition, the lightness index L* value, a* value, and b* value are quantities defined in the orthogonal coordinate system in the CIE 1976 L*a*b* color space, are expressed in the following formulas (1) to (3).

$$L^* = 116(Y/Y_\theta)^{1/3} - 16 \quad (1)$$

$$a^* = 500[(X/X_\theta)^{1/3} - (Y/Y_\theta)^{1/3}] \quad (2)$$

$$b^* = 200[(Y/Y_\theta)^{1/3} - (Z/Z_\theta)^{1/3}] \quad (3)$$

Here, $X/X_\theta$, $Y/Y_\theta$, and $Z/Z_\theta > 0.008856$, wherein X, Y, and Z are the tristimulus values of the object color.

Furthermore, $X_\theta$, $Y_\theta$, and $Z_\theta$ are the tristimulus values of the light source that illuminates the object color, and are standardized to $Y_\theta=100$. Furthermore, the lightness index L* value of the alumina-coated zirconium nitride powder (black powder) is determined using, for example, a spectro color difference meter (model: SE7700) produced by Nippon Denshoku Industries Co., Ltd. Herein, the brightness index L* value of the alumina-coated zirconium nitride powder (black pigment) is preferably 13 or lower. The L* value was limited to 13 or lower, because if it exceeds 13, the blackness is insufficient and the prescribed color tone cannot be obtained as a black pigment.

On the other hand, the BET specific surface area is determined by adsorbing gas molecules (e.g. nitrogen gas, etc.) whose adsorption occupied area is known on the surface of the above powder (black pigment) using, for example, a specific surface area measurement apparatus (model: SA1100) produced by Shibata Scientific Technology Ltd and then from the amount of adsorption obtained thereby. Here, by applying the BET formula (a formula that shows the relationship between the adsorption equilibrium pressure and the amount adsorbed at this pressure when it is in an equilibrium state of adsorption at a certain temperature) to the information of the process of transition from first layer adsorption to multi-layer adsorption of a gas molecule adsorbed on the surface of a powder (black pigment), the amount of the gas molecules in only one layer is measured and an accurate specific surface area may be measured. Herein, a preferred range of the BET specific surface area of the above powder (black pigment) was limited to 20 m$^2$/g or higher, because if it is lower than 20 m$^2$/g, coloring power (color developing power) is reduced.

There are the following two methods for producing the zirconium nitride powder coated with alumina thus constructed.

<First Producing Method>

First, a zirconium nitride powder is made. Specifically, a zirconium dioxide powder or a zirconium dioxide powder coated with silica, a metallic magnesium powder, and a magnesium nitride powder are mixed so that the metallic magnesium has a ratio of 2.0 times mole to 6.0 times mole of the zirconium dioxide and the magnesium nitride has a ratio of 0.3 times mole to 3.0 times mole of the zirconium dioxide to obtain a mixture. Then, the zirconium dioxide powder is reduced by calcining this mixture under an atmosphere of nitrogen gas alone, or a mixed gas of nitrogen gas and hydrogen gas, or a mixed gas of nitrogen gas and ammonia gas, at a temperature of 650° C. to 900° C. to make the zirconium nitride powder.

Herein, the metallic magnesium was limited to the range of 2.0 times mole to 6.0 times mole of the zirconium dioxide, because if it is lower than 2.0 times mole, the reduction power of the zirconium dioxide is insufficient, and if it exceeds 6.0 times mole, the reaction temperature increases rapidly due to the excess metallic magnesium, which may cause grain growth of the powder and is uneconomical. Furthermore, the magnesium nitride was limited to the range of 0.3 times mole to 3.0 times mole of the zirconium dioxide, because if it is lower than 0.3 times mole, it does not prevent the zirconium nitride powder from sintering, and if it exceeds 3.0 times mole, there is a problem that an amount of an acidic solution required for acid cleaning after the calcining increases.

Then, the above zirconium nitride powder is ground in water to prepare a zirconium nitride slurry, and then an aluminum compound is dissolved in a solvent to prepare an aluminum compound solution. Herein, the aluminum compound includes aluminum hydroxide, aluminum sulfate, or sodium aluminate, aluminum hydroxide is used by dissolving it in an acid or alkaline solvent such as hydrochloric acid or caustic soda, aluminum sulfate is used by dissolving it in a solvent such as water and alcohol, and sodium aluminate is used by dissolving it in a solvent such as water and alcohol. Then, the aluminum compound solution is added to the zirconium nitride slurry so that zirconium nitride powder:alumina has a mass ratio of (100:1.5) to (100:15), preferably (100:2) to (100:10). Herein, zirconium nitride powder:alumina was limited to the range of (100:1.5) to (100:15) by mass ratio, because if it is outside the above range, sufficient insulation is not obtained or a light shielding property is insufficient.

Next, an acid is added to the zirconium nitride slurry to which the aluminum compound solution has been added to adjust the pH of the zirconium nitride slurry and deposit the aluminum compound on the surface of the zirconium nitride to coat the zirconium nitride powder with the aluminum compound. Then, the zirconium nitride powder coated with the aluminum compound is collected after washing. Furthermore, the zirconium nitride coated with alumina is obtained by calcining this collected zirconium nitride powder coated with the aluminum compound in an air or nitrogen atmosphere at a temperature of 60° C. to 200° C. for 1 hour to 24 hours. Herein, the calcining temperature of the above powder was limited to the range of 60° C. to 200° C., because if it is lower than 60° C., moisture remains and insulation is insufficient, if it exceeds 200° C., grain growth of alumina occurs and coverage of the zirconium nitride powder with alumina is reduced. Furthermore, the calcining time of the above powders was limited to the range of 1 to 24 hours, because if it is lower than 1 hour, drying is insufficient, and if it exceeds 24 hours, it is economically unfavorable.

<Second Producing Method>

First, a zirconium nitride powder is made by the same method as the above first producing method. Then, this zirconium nitride powder is dispersed in a solvent to prepare a zirconium nitride slurry. Solvents include isopropanol (IPA), butyl acetate (BA), and methyl ethyl ketone (MEK). Next, an aluminate coupling agent is added to the zirconium nitride slurry so that zirconium nitride powder:alumina has a mass ratio of (100:1.5) to (100:15). Herein, zirconium nitride powder:alumina was limited to the range of (100:1.5) to (100:15) by mass ratio, which is based on the same reason as the above first producing method. Furthermore, the zirconium nitride coated with alumina is obtained by removing a supernatant liquid by decantation to obtain a precipitate, and then calcining this precipitate in a nitrogen atmosphere at a temperature of 200° C. to 400° C. for 3 hours to 24 hours. Herein, the calcining temperature of the powder was limited to the range of 200° C. to 400° C., because if it is lower than 200° C., a residual amount of an organic substance is large, and coating strength of the zirconium nitride powder with alumina is insufficient, if it exceeds 400° C., grain growth of the aluminum oxide occurs. Furthermore, the calcining time of the above powders was limited to the range of 3 hours to 24 hours, which is based on the same reason as the above first producing method.

The isoelectric point of the alumina-coated zirconium nitride powder produced in this way is 5.7 or higher, and therefore the compatibility with an acrylic resin is good, and the compatibility between the alumina-coated zirconium nitride powder (black pigment) and the acrylic resin may be improved. Furthermore, by coating the zirconium nitride powder with alumina, moisture resistance in combination with a gas barrier property may also be improved.

The above alumina-coated zirconium nitride powder may be used to form a coating layer by the following method. First, an amine-based dispersant is added and a dispersion treatment was carried out in a solvent such as propylene glycol monomethyl ether acetate (PGM-Ac), diethyl ketone, and butyl acetate to prepare a dispersion. Next, an acrylic resin is added to this dispersion at a mass ratio of black pigment:resin=(10:90) to (80:20), and mixed to prepare a black composition. Furthermore, this black composition is spin-coated on a glass substrate, a polyethylene terephthalate (PET) substrate, a polycarbonate (PC) substrate, and the like, and held at a temperature of 60° C. to 250° C. for 1 minute to 60 minutes to obtain a dried coating layer with a thickness of 0.5 μm to 10 μm. When forming a layer on a resin substrate, UV curing with the addition of a photoinitiator and a reactive monomer may be used, since it cannot be calcined at a high temperature.

EXAMPLES

Next, Examples of the present invention will be described in detail together with Comparative Examples.

Example 1

To 7.4 g of a monoclinic zirconium dioxide powder having an average primary particle diameter of 50 nm calculated from the specific surface area measured by the BET method were added 7.3 g of a metallic magnesium powder having an average primary particle diameter of 150 μm and 3.0 g of a magnesium nitride powder having an average primary particle diameter of 200 nm, and the mixture was uniformly mixed by a reaction apparatus in which a graphite port has been internally mounted in a glass tube made of quartz. At this time, an amount of the metallic magnesium added was 5.0 times mole of the zirconium dioxide, and an amount of the magnesium nitride added was 0.5 times mole of the zirconium dioxide. This mixture was calcined under an atmosphere of nitrogen gas at a temperature of 700° C. for 60 minutes to obtain a calcined product. This calcined product was dispersed in 1 liter of water, 17.5% hydrochloric acid was gradually added thereto, and the mixture was washed at a pH of 1 or higher while maintaining a temperature of 100° C. or lower, and then adjusted to a pH of 7 to 8 with 2.5% aqueous ammonia, and filtered. The filtered solid content was redispersed in water with 400 g/liter, and once again, washed with acid in the same manner as described above and adjusted the pH with aqueous ammonia, and then filtered. After repeating the acid washing-pH adjustment by aqueous ammonia twice in this way, the filtrate was dispersed in ion exchange water at 500 g/liter in terms of a solid content, and the dispersion was heated and stirred at 60° C. and adjusted to pH 7, and then filtered by a suction filtration apparatus, furthermore, washed with an equal amount of ion exchange water, and dried in a hot air dryer at a set temperature of 120° C. to obtain a zirconium nitride powder.

The zirconium nitride powder having an average particle size of 30 nm was obtained by grinding the above zirconium nitride in water with a beads mill (using zirconia beads having a diameter of 0.3 mm). To this ground zirconium nitride slurry (the zirconium nitride powder (black pigment) concentration 10%), a 5% aluminum hydroxide solution (a solution of aluminum hydroxide dissolved in caustic soda) was added so that $Al_2O_3$ was 5% by mass with respect to 100% by mass of the zirconium nitride. The pH of the slurry at this time was 10. Next, 17.5% hydrochloric acid was added dropwise to the above slurry until the pH reached 5. As a result, aluminum hydroxide was deposited on the zirconium nitride surface. This slurry was washed by decantation several times, and then filtered to collect a cake (dreg deposited on the surface of a filter material). The zirconium nitride powder coated with alumina was obtained by calcining the resulting cake in a nitrogen atmosphere at a temperature of 300° C. for 1 hours. This alumina-coated zirconium nitride powder was designated as Example 1. As is clear from the photographic diagram (×500,000) of FIG. 1 and the photographic diagram (×1,000,000) of FIG. 2, the zirconium nitride powder was coated with an alumina layer. The content (coating amount) of alumina coating the zirconium nitride powder was measured by inductively coupled plasma emission spectroscopic analysis (ICP emission analyzer ICPS-7510 produced by Shimadzu Corporation).

Examples 2 to 5 and Comparative Examples 1 to 4

Each raw material was formulated respectively so that the alumina coating amount (Comparative Example 1: uncoated, Comparative Example 4: a silica coating amount) of the zirconium nitride powders in Examples 2 to 5 and Comparative Examples 1 to 4 had the values shown in Table 1. Except for the alumina coating amount shown in Table 1, the alumina-coated zirconium nitride powders (Comparative Example 1: an uncoated zirconium nitride powder, Comparative Example 4: a silica-coated zirconium nitride powder) were produced in the same manner as in Example 1.

<Comparative Test 1>

The volume resistivity, the isoelectric point, the L* value, and the BET specific surface area were measured for each powder of Examples 1 to 5 and Comparative Examples 1 to 4, respectively.

(1) Volume Resistivity of the Powder

To a pressure vessel, 6.0 g of the above powder was placed and compressed at 9.8 MPa to form a green compact, and the resistance of this green compact was measured with a digital multimeter. Then, the volume resistivity (Ω·cm) of the powder was obtained by multiplying the obtained resistance value by the resistivity correction factor (RCF), which is referenced based on a thickness of the green compact, and a shape of an apparatus and the thickness of the green compact. This volume resistivity was designated as the volume resistivity of the powder (Ω·cm). The results are shown in Table 1.

(2) Isoelectric Point of the Powder

The above powder was dispersed in water, and 1N (1 mole/liter) of HCl was added to the dispersion to change the pH of the dispersion, and the change in zeta potential was measured using a zeta potential meter (model: DT1202) produced by Dispersion Technology. Then, the pH at which the zeta potential became zero was designated as the isoelectric point of the powder. The results are shown in Table 1.

(3) L* Value of the Powder

The lightness index L* value of the above powder was determined using a spectro color difference meter (model: SE7700) produced by Nippon Denshoku Industries Co., Ltd. The results are shown in Table 1.

(4) BET Specific Surface Area of the Powder

The BET specific surface area of the above powder was measured using a specific surface area measuring apparatus (model: SA1100) produced by Shibata Scientific Technology Ltd. The results are shown in Table 1.

<Comparative Test 2>

For each powder of Examples 1 to 5 and Comparative Examples 1 to 4, an amine-based dispersant was added and a dispersion treatment was carried out in propylene glycol monomethyl ether acetate (PGM-Ac) solvent to prepare a dispersion. An acrylic resin was added to this dispersion at a mass ratio of black pigment:resin=5:5, and mixed to prepare a black composition. This black composition was spin-coated on a glass substrate and held at a temperature of 250° C. for 30 minutes to obtain a dry coating layer having a thickness of 1 μm. The blackness and volume resistivity of these coating layers were measured, respectively.

(a) Blackness of the Coating Layer

The blackness of the coating layer was evaluated by the OD value of the above coating layer in visible light (center wavelength 650 nm). Specifically, the amount of light incident on the above coating layer, $I_0$, and the amount of light transmitted through the coating layer, I, were measured using a densitometer (densitometer) with the product name D200 produced by Macbeth, respectively, and the OD value was calculated by substituting the above incident light amount $I_0$ and transmitted light amount I into the following equation (4).

$$\text{OD value} = -\log_{10}(I/I_0) \quad (4)$$

The results are shown in Table 1.

Then, in Table 1, the coating layer with an OD value of 2.5 or higher at 650 nm in a visible light was regarded as "good", and the coating layer with an OD value of lower than 2.5 at 650 nm in a visible light was regarded as "poor".

(b) Volume Resistivity of the Coating Layer

The volume resistivities of the coating layer were measured immediately after this coating layer was made (initial stage) and after it was held in an atmosphere at a temperature of 80° C. and a humidity of 80% for 1000 hours (after heating and humidification), respectively. The volume resistivity (Ω·cm) of the above coating layer in initial stage and after heating and humidification was measured using a resistivity meter (Hiresta (trademark), model number: MCP-HT450) produced by Mitsubishi Chemical Analytech, Co., Ltd. The results are shown in Table 1.

which was within a preferable range (20 m²/g or higher), and an L* value of 11.2, which was within a preferable range (13 or lower), it had a volume resistivity of 1.80×10⁵ Ω·cm, which was lower than an appropriate range (1×10⁶ Ω·cm or higher), and an isoelectric point of 5.5, which was lower than an appropriate range (5.7 or higher).

Although the zirconium nitride powder of Comparative Example 2, which had an alumina coating amount of 1.0% by mass, which was lower than an appropriate range (1.5% by mass to 9% by mass), had a BET specific surface area of 50.2 m²/g, which was within the preferable range (20 m²/g or higher), and an L* value of 10.9, which was within the preferable range (13 or lower), it had a volume resistivity of 7.10×10⁵ Ω·cm, which was lower than the appropriate range (1×10⁶ Ω·cm or higher), and an isoelectric point of 5.6, which was lower than the appropriate range (5.7 or higher).

Although the zirconium nitride powder of Comparative Example 3, which had an alumina coating amount of 10% by mass, which was higher than the appropriate range (1.5% by mass to 9% by mass), had a volume resistivity of 1.20×10⁹ Ω·cm, which was within the appropriate range (1×10⁶ Ω·cm or higher), a BET specific surface area of 80.0 m²/g, which was within the preferable range (20 m²/g or higher), and an isoelectric point of 8.0, which was within the appropriate range (5.7 or higher), it had an L* value of 13.1, which was higher than the preferable range (13 or lower).

The zirconium nitride powder of Comparative Example 4, which had a coating amount of 5.0% by mass, which was within the appropriate range (1.5% by mass to 9% by mass), however coated with silica instead of alumina. Although it had a volume resistivity of 6.00×10⁷ Ω·cm, which was within the appropriate range (1×10⁸ Ω·cm or higher), a BET specific surface area of 60.0 m²/g, which was within the preferable range (20 m²/g or higher), and an L* value of 11.5, which was within the preferable range (13 or lower), it had an isoelectric point of 3.5, which was lower than the appropriate range (5.7 or higher).

In contrast, the zirconium nitride powders of Examples 1 to 5, which had alumina coating amounts of 1.5% by mass to 9.0% by mass, which were within the appropriate range

TABLE 1

| | Alumina-coated zirconium nitride powder | | | | | Coating layer | | |
| --- | --- | --- | --- | --- | --- | --- | --- | --- |
| | Alumina coating amount (% by mass) | Volume resistivity (Ω · cm) | Isoelectric point | L* value | BET specific surface area | Blackness | Volume resistivity (Ω · cm) | |
| | | | | | | | Initial stage | After heating and humidifycation |
| Example 1 | 1.5 | $9.29 \times 10^7$ | 5.8 | 11.0 | 54.6 | Good | $>1 \times 10^8$ | $>1 \times 10^8$ |
| Example 2 | 3.0 | $2.19 \times 10^7$ | 6.2 | 11.3 | 57.2 | Good | $>1 \times 10^8$ | $>1 \times 10^8$ |
| Example 3 | 5.0 | $4.80 \times 10^8$ | 6.15 | 11.2 | 63.2 | Good | $>1 \times 10^8$ | $>1 \times 10^8$ |
| Example 4 | 7.0 | $2.20 \times 10^8$ | 7.2 | 11.5 | 70.5 | Good | $>1 \times 10^8$ | $>1 \times 10^8$ |
| Example 5 | 9.0 | $4.50 \times 10^8$ | 7.8 | 12.5 | 75.0 | Good | $>1 \times 10^8$ | $>1 \times 10^8$ |
| Comparative Example 1 | 0 | $1.80 \times 10^5$ | 5.5 | 11.2 | 60.6 | Good | $>1 \times 10^8$ | $<1 \times 10^3$ |
| Comparative Example 2 | 1.0 | $7.10 \times 10^5$ | 5.6 | 10.9 | 50.2 | Good | $>1 \times 10^8$ | $<1 \times 10^6$ |
| Comparative Example 3 | 10 | $1.20 \times 10^9$ | 8.0 | 13.1 | 80.0 | Poor | $>1 \times 10^8$ | $>1 \times 10^8$ |
| Comparative Example 4 | 5.0 (silica) | $6.00 \times 10^7$ | 3.5 | 11.5 | 60.0 | Good | $>1 \times 10^8$ | $<1 \times 10^4$ |

<Evaluation>

As is clear from Table 1, although the zirconium nitride powder of Comparative Example 1, which was not coated with alumina, had a BET specific surface area of 60.6 m²/g, (1.5% by mass to 9% by mass), had volume resistivities of 2.19×10⁷ Ω·cm to 4.80×10⁸ Ω·cm, which were within the appropriate range (1×10⁸ Ω·cm or higher), isoelectric points of 5.8 to 7.8, which were within the appropriate range (5.7 or higher), L* values of 11.0 to 12.5, which were within the preferable range (13 or lower), and BET specific surface areas of 54.6 m$^2$/g to 75.0 m$^2$/g, which were within the preferable range (20 m$^2$/g or higher).

On the other hand, although the coating layer of Comparative Example 1, which was not coated with alumina, had a good blackness of the coating layer, it had a reduced moisture resistance in which the volume resistivity of the coating layer after heating and humidification was lower than 1×10$^3$ Ω·cm.

Although the coating layer of Comparative Example 2, which had an alumina coating amount of 1.0% by mass, which was lower than the appropriate range (1.5% by mass to 9% by mass), had a good blackness of the coating layer, it had a reduced moisture resistance in which the volume resistivity of the coating layer after heating and humidification was lower than 1×10$^6$ Ω·cm.

Although the coating layer of Comparative Example 3, which had an alumina coating amount of 10% by mass, which was higher than the appropriate range (1.5% by mass to 9% by mass), was good because the volume resistivity of the coating layer after heating and humidification was higher than 1×10$^8$ Ω·cm, it had a poor blackness of the coating layer.

The coating layer of Comparative Example 4, which had a coating amount of 5.0% by mass, which was within the appropriate range (1.5% by mass to 9% by mass), however using the zirconium nitride powder coated with silica instead of alumina. Although it had a good blackness of the coating layer, it had a reduced moisture resistance in which the volume resistivity of the coating layer after heating and humidification was lower than 1×10$^4$ Ω·cm.

In contrast, the coating layers of Examples 1 to 5, which had alumina coating amounts of 1.5% by mass to 9.0% by mass, which were within the appropriate range (1.5% by mass to 9% by mass), all had good blackness of the coating layers, and good moisture resistances in which the volume resistivities of the coating layers after heating and humidification were higher than 1×10$^8$ Ω·cm.

INDUSTRIAL APPLICABILITY

The zirconium nitride powder coated with alumina of the present invention may be utilized for a high-definition liquid crystal, a black matrix for organic EL, a light shielding material for an image sensor, a light shielding material for an optical member, a light shielding filter, an IR (infrared) cut filter, a coverlay film, a light shielding film for an electronic member, a black film, a UV curable adhesive, and the like.

The invention claimed is:

1. A zirconium nitride powder coated with alumina, wherein
a volume resistivity is 1×10$^6$ Ω·cm or higher, an coating amount with alumina is 1.5% by mass to 9% by mass with respect to 100% by mass of the zirconium nitride, and an isoelectric point of the zirconium nitride is 5.7 or higher.

2. A process for producing a zirconium nitride powder coated with alumina, comprising:
grinding a zirconium nitride powder in water to prepare a zirconium nitride slurry,
dissolving an aluminum compound in a solvent to prepare an aluminum compound solution,
adding the aluminum compound solution to the zirconium nitride slurry so that zirconium nitride powder:alumina has a mass ratio of (100:1.5) to (100:15),
coating the zirconium nitride powder with the aluminum compound by adding an acid to the zirconium nitride slurry to which the aluminum compound solution has been added, so as to adjust a pH of the zirconium nitride slurry and deposit the aluminum compound on a surface of the zirconium nitride powder,
washing and then collecting the zirconium nitride powder coated with the aluminum compound,
obtaining the zirconium nitride coated with alumina by calcining the collected zirconium nitride powder coated with the aluminum compound in an air or nitrogen atmosphere at a temperature of 60° C. to 200° C. for 1 hour to 24 hours.

3. The process for producing the zirconium nitride powder coated with alumina according to claim 2, wherein the aluminum compound is either aluminum hydroxide, aluminum sulfate, or sodium aluminate.

4. A process for producing a zirconium nitride powder coated with alumina, comprising:
dispersing a zirconium nitride powder in a solvent to prepare a zirconium nitride slurry,
adding an aluminate coupling agent to the zirconium nitride slurry so that zirconium nitride powder:alumina has a mass ratio of (100:1.5) to (100:15),
removing a supernatant liquid by decantation to obtain a precipitate,
obtaining the zirconium nitride coated with alumina by calcining the precipitate in a nitrogen atmosphere at a temperature of 200° C. to 400° C. for 3 hours to 24 hours.

* * * * *